Figure 1:
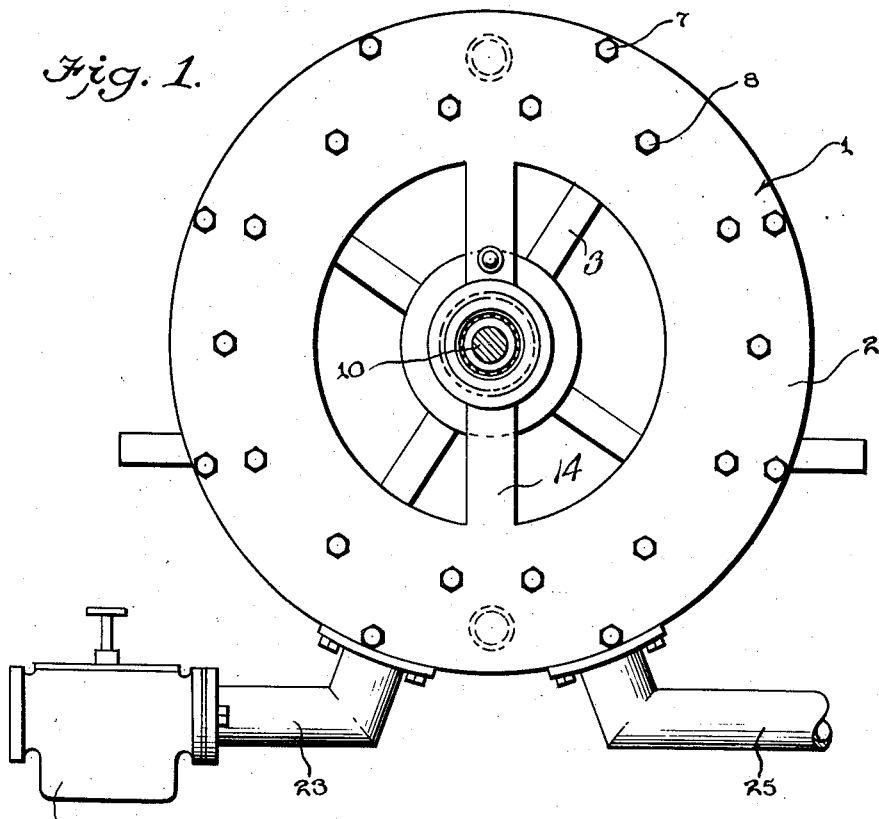

Aug. 2, 1927.  1,637,958
F. M. NEWSON
INTERNAL COMBUSTION ENGINE
Filed Jan. 13, 1926   3 Sheets-Sheet 1

WITNESSES
H. A. LaClair

INVENTOR
F. M. Newson
BY
ATTORNEYS

Aug. 2, 1927.

F. M. NEWSON 1,637,958

INTERNAL COMBUSTION ENGINE

Filed Jan. 13, 1926 — 3 Sheets-Sheet 2

WITNESSES
H. A. LaBlair

INVENTOR
F. M. Newson
BY
ATTORNEYS

Aug. 2, 1927.
F. M. NEWSON
1,637,958
INTERNAL COMBUSTION ENGINE
Filed Jan. 13, 1926   3 Sheets-Sheet 3
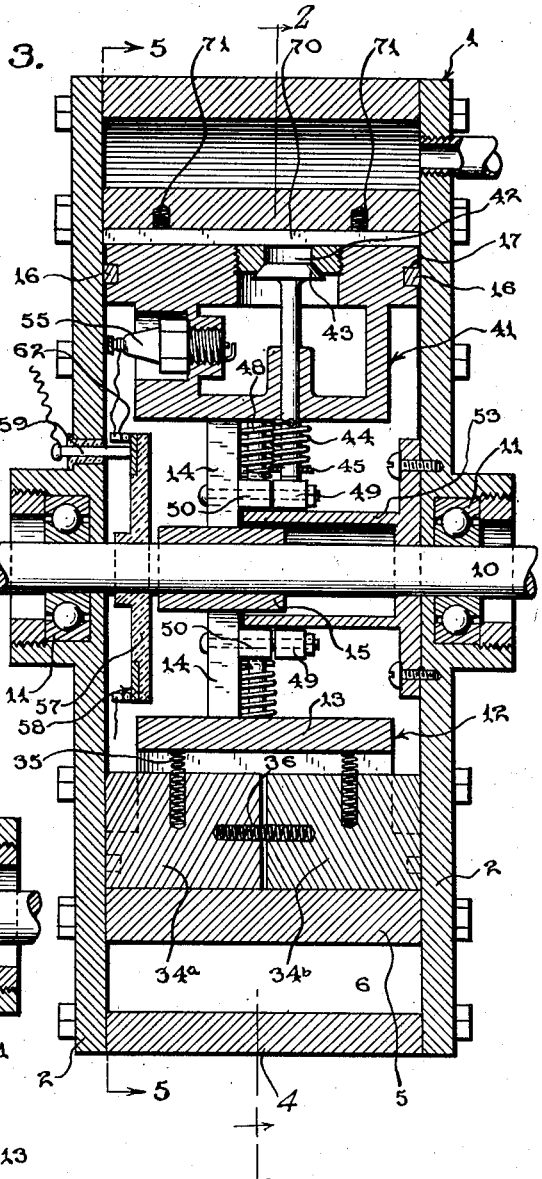
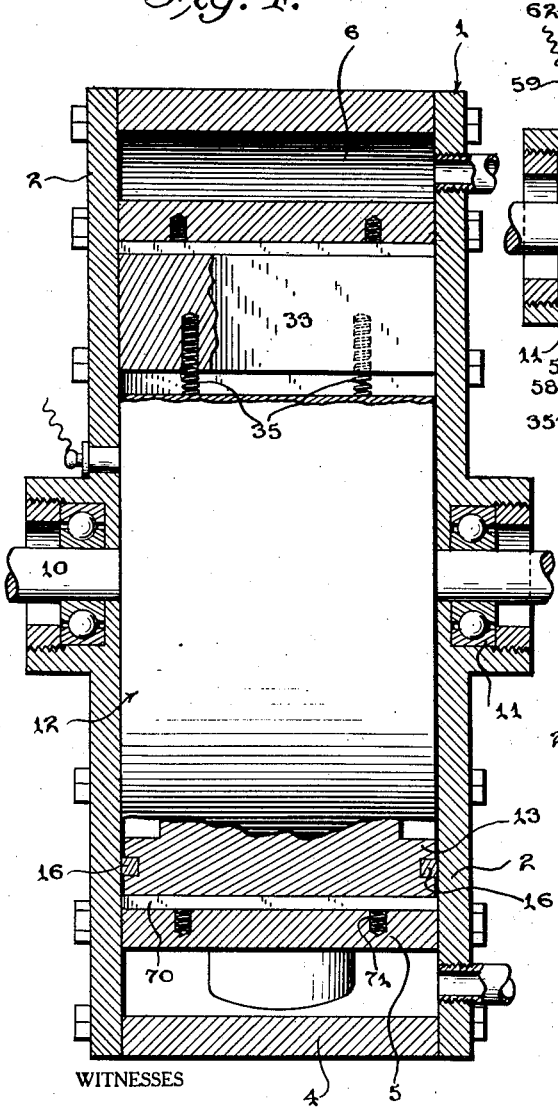
WITNESSES
H. A. La Clair
INVENTOR
F. M. Newson
BY
ATTORNEYS Patented Aug. 2, 1927.

1,637,958

UNITED STATES PATENT OFFICE.

FREDERICK M. NEWSON, OF SALT LAKE CITY, UTAH.

INTERNAL-COMBUSTION ENGINE.

REISSUED

Application filed January 13, 1926. Serial No. 81,050.

This invention relates in general to internal combustion engines and more particularly to an internal combustion engine of the rotary type.

The object of the invention is to provide a rotary internal combustion engine of this character which utilizes all of the energy in the fuel to develop the maximum power which is highly flexible in operation, which minimizes if not entirely eliminates vibration and which is of simple and durable construction, involving only a comparatively few parts, reliable and efficient in operation and easy and comparatively inexpensive to manufacture.

In carrying out the present invention there is provided a stationary casing in which a rotor operates, the rotor and casing co-acting to define an intake and compression chamber and a working or expansion chamber. Sliding vanes mounted on the rotor, co-act with the stationary casing, and operate in the compression and intake chamber and in the expansion or working chamber. The rotor has formed therein a chamber adjacent each sliding vane and the chambers of the rotor are adapted to serve as compression chambers to receive the compressed charge from the intake and compression chamber and also to serve as transfer chambers for transferring the compressed charge from the intake and compression chamber to the expansion chamber after or as the charge has been fired. The charge is fired in the rotor chamber. The flow of the combustible charge into the compression and transfer chamber and out of its chamber is controlled by intake and exhaust valves positively operated in synchronism with the cycle of operation of the engine. The sliding vanes are of novel construction to prevent leakage of the working fluid or combustible charge and are spring-pressed into engagement with the inner peripheral wall of the stationary casing which wall controls the operation of the vanes. The rotor and casing are so organized and are provided with packing means of such character as to prevent escape of the working fluid or combustible charge.

The engine may be supplied with fuel by any desirable type of carbureter and one of the advantages of the invention resides in the fact that the combustible mixture after having been fired is completely expanded and forcibly discharged under the action of the vanes at practically atmospheric pressure. The engine is partly water cooled and partly air cooled to insure better efficiency in operation and to simplify the construction.

Figure 6:
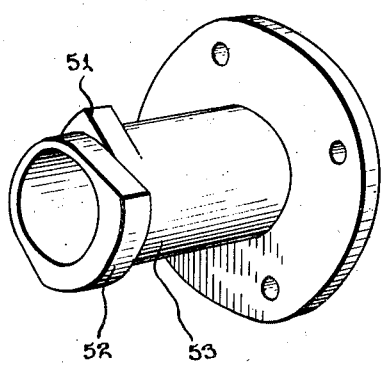
Figure 7:
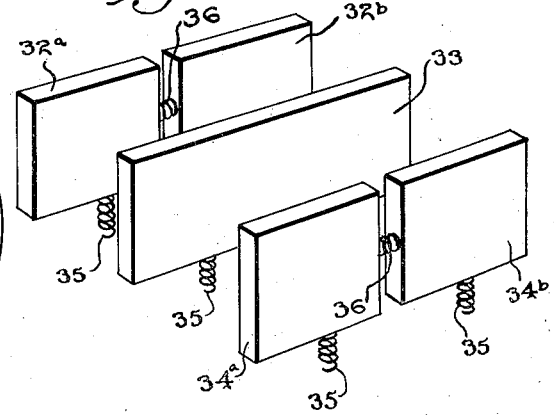
Figure 2:
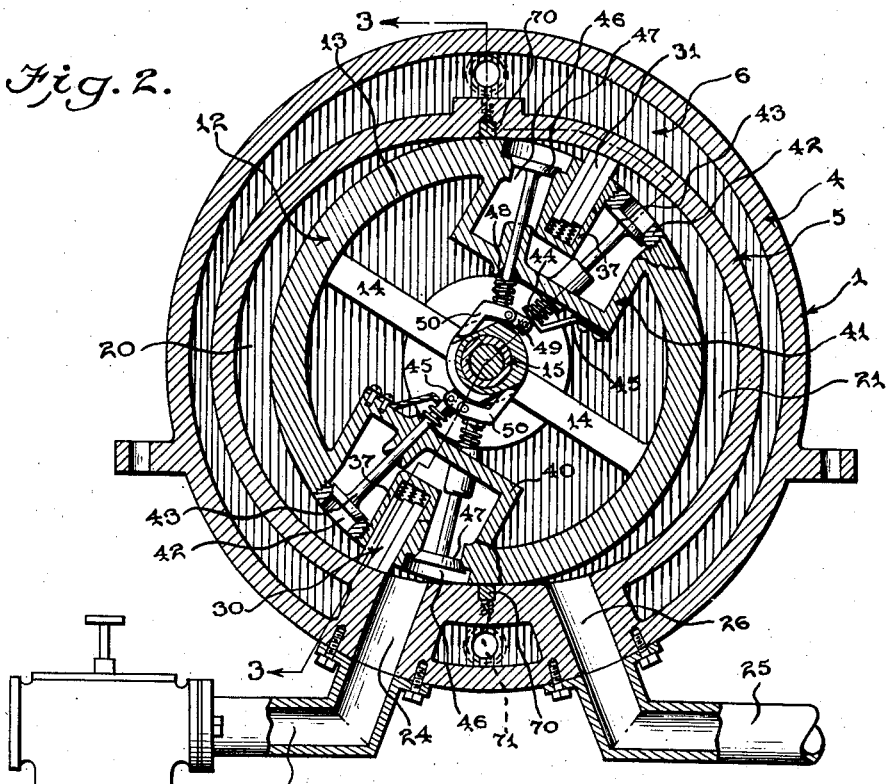
Figure 5:
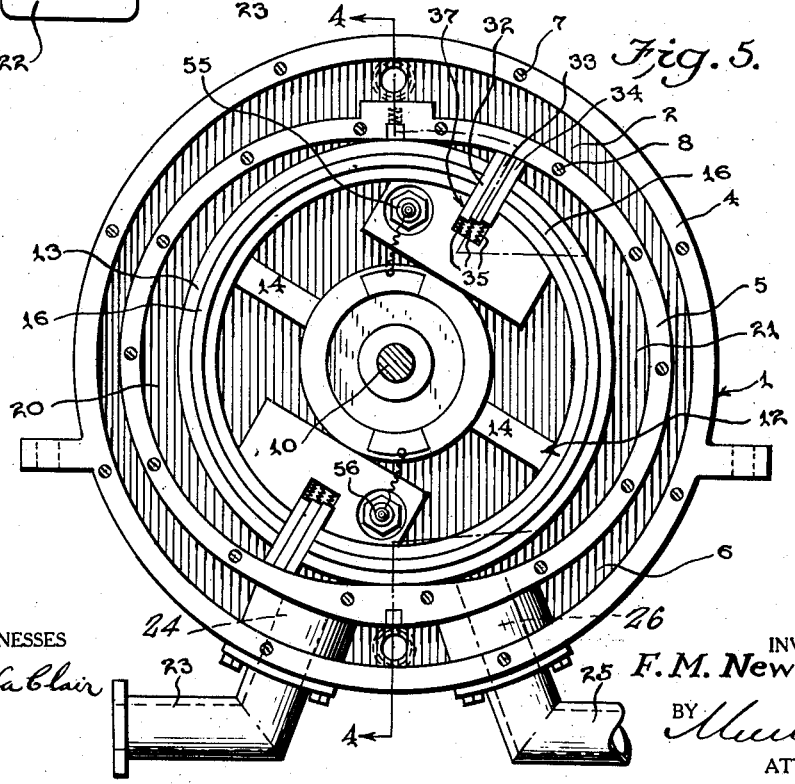

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view in elevation showing an engine constructed in accordance with the present invention, Figure 2 is a view in section on the line 2—2 of Figure 3, parts being shown in elevation for the sake of illustration, Figure 3 is a sectional view on the line 3—3 of Figure 2, Figure 4 is a sectional view on the line 4—4 of Figure 5, Figure 5 is a sectional view on the line 5—5 of Figure 3, Figure 6 is a detail perspective view showing the valve operating cams and their mounting means, and Figure 7 is a detail perspective view of one of the sliding vane assemblies.

Referring to the drawings the numeral 1 designates generally a casing including a pair of side plates 2 of annular form and having diametrically opposed portions connected by cross arms 3. Any suitable type of supporting bracket may be employed in conjunction with the side plates to hold the casing 1 fixed and stationary. The casing 1 is completed by an outer peripheral wall 4 and an inner peripheral wall 5, there being a space 6 between the walls 4 and 5 through which water is circulated for cooling purposes. The side plates 2 and peripheral walls 4 and 5 are held assembled by bolts and nuts, designated at 7 and 8.

A shaft 10 is rotatably mounted in bearings 11 provided therefor on the cross arm 3. A rotor, designated generally at 12, is provided and has a body 13 mounted on radial arms or spokes 14 carried by a hub 15 keyed on the shaft 10. The side faces of the body of the hub flatly engage the inner side faces of the plates 2 of the stationary casing in such manner as to permit relative rotation of the rotor and hub while preventing escape of the gases or working fluid. Arcuate packing rings 16 are fitted in grooves 17 in the sides of the body of the rotor and engage the inner faces of the side plates 2 to insure prevention of the escape of the combustible gases or working fluid. As clearly shown in Figs. 2 and 5 the rotor is of approximately circular form but the inner wall 5 of the casing bulges out at each side to coact with the side plates 2 and with the rotor to define an intake and compression chamber 21 and a working or expanding chamber 21.

Means is provided for supplying a combustible fuel mixture to the intake and compression chamber 20 and consists of a carbureter 22 from which an induction pipe 23 leads to an intake pipe 24 formed in the stationary casing, traversing the water space 6, and discharging into one end of the intake and compression chamber 20.

An exhaust pipe 25 communicates with one end of the working or expanding chamber 21 through an exhaust passage 26 formed in the casing 1 and also extends across the water space 6 and opens into one end of the working or expanding chamber 21.

Sliding vane assemblies, designated generally at 30 and 31, are provided at spaced intervals about the rotor and in the present invention two such vane assemblies are provided at diametrically opposite points. The details of each vane assembly are the same and, therefore, a common description will apply to both. Each vane assembly includes three plate-like vanes, designated at 32, 33 and 34. The vane 33 consists of a solid one-piece plate spring pressed outwardly by means of a number of coil springs 35. The vanes 32 and 34 which are located on the opposite sides of the vane 33 are likewise pressed outwardly by means of similar springs 35 but these vanes 32 and 34 instead of being constructed of one-piece are made in two sections or halves, designated at 32$^a$ and 32$^b$ and 34$^a$ and 34$^b$, respectively, and the sections of each of the vanes 32 and 34 are forced apart transversely or laterally by means of an expansible coil spring 36 having its ends engaging seats in the adjacent portions of the sections of the vanes. The vane assemblies are received in pockets or slots 37 provided therefor in the rotor. The springs 35 engage the inner walls of these pockets or slots and are tensioned to force the vanes outwardly against the inner surface of the inner peripheral wall 5. The feature of having the intermediate vane of the three that make up each assembly solid and the outside vanes sectional and forced laterally against the inner faces of the side walls 2 of the stationary casing prevents escape of gases between the ends of the vane and the side wall. The opening or space between the adjacent edges of the sections of the vanes 32 and 34 of each assembly does not affect the efficacy of the vane due to the provision of the one-piece vane 33.

Adjacent each vane assembly a chamber is built into the structure of the rotor and in the present embodiment there are two such chambers, designated at 40 and 41, inasmuch as there are two vanes 30 and 31. The chambers 40 and 41 are of identical construction and serve as compression chambers for receiving the charge as it is compressed in the chamber 20, as transfer chambers for transferring the compressed charge into the expanding or working chamber just as the same is fired. Since the charges are fired in the chambers 40 and 41 these chambers also serve as firing chambers but the gases are permitted to expand and do their work in the chamber 21. As shown clearly in Figure 2 of the drawings, each chamber extends around the vane with which it is associated. In advance of the vane each chamber is provided with an inlet 42 controlled by an inwardly opening inlet valve 43. The valve 43 has its stem extended through a suitable guide in the chamber with which it is associated and is pressed outwardly against its seat by means of a coil spring 44 engaging a pin in the valve stem and an abutment 45 fastened to the inner wall of the chamber with which the valve is associated. Rearwardly or behind the associated vane each chamber is provided with an outlet opening 46 controlled by an outwardly opening and inwardly closing outlet valve 47. The stem of the valve 47 extends through a suitable guide provided in the chamber in which it is mounted and inwardly of the chamber has a coil spring 48 associated therewith, the coil spring having its outer end abutting the associated vane and having its inner end engaging a pin in the valve stem so as to operate to close the valve. Valve operators or lifters 49 and 50 are provided for the valves 43 and 47, respectively. The valve lifters 49 and 50 are pivotally mounted on certain spokes 14 of the rotor and they co-act with the fixed cams 51 and 52 provided on a cam sleeve 53 which loosely encircles the shaft 10 and which has a flange 54 fastened by screws or the like to one of the bearings 11. By means of the cams and lifters the valves are positively opened at the proper time in the cycle of operation and are permitted to close under the action of their springs at the proper time. Spark plugs 55 and 56 are provided in the chambers 40 and 41, respectively, and these spark plugs are embodied in a suitable ignition system which may include a fiber disc 57 keyed on the shaft 10 and having arcuate contact plates 58 imbedded therein and receiving a high tension current from a brush 59. The contact plates are electrically connected, as at 62, with the spark plug whereby to cause the spark plugs to operate in time sequence with the cycle of the engine.

It will be noted that in between the chambers 20 and 21 the rotor engages inwardly directed portions of the inner peripheral wall 5 of the casing and such portions of the wall 5 are provided with packing shoes 70 pressed inwardly against the rotor by springs 71. The purpose of these shoes is to insure isolation of the chambers 20 and 21 in so far as direct communication is concerned.

In operation the rotor is turned in a clockwise direction, as viewed in Figure 2, and when this occurs the vane assembly 30 sweeps across the chamber 20 and draws into the chamber 20 a combustible charge. The vane assembly 30 passes into the chamber 21 and simultaneously with the passage of the vane assembly 30 into the chamber 21, the vane assembly 31 passes into the chamber 20 and sweeps through the chamber 20, compressing the charge drawn into such chamber by the vane assembly 30 and also drawing in behind it a charge from the carbureter. As the vane assembly 31 compresses the charge in the chamber 20 this charge is forced into the chamber 41 of the rotor since the valve 43 is positively opened at this time by the cam 51. After the charge has been fully compressed it is entirely contained in the chamber 41 and it is held therein because the valve 43 closes. The exhaust valve 47 is also closed and remains closed until the chamber 41 has carried over into the upper portion of the chamber 21 whereupon the cam 52 opens the valve 47. Simultaneously with the opening of the valve 47 or just before this valve 47 opens the charge is fired in the chamber 41. The expansion which follows the firing of the charge occurs in the chamber 21 and acts on the vane assembly 31 to impart a powerful impulse to the rotor. In the chamber 21 the fired charge is fully expanded before the vane assembly 31 passes the exhaust pipe 26 and permits the spent gases to exhaust. Complete expulsion of the exhaust gases is insured by the vane assembly 30 which carry the exhaust gases before it to the exhaust pipe 26. The charge that has been drawn in by the vane 31 is now compressed by the vane assembly 30 and is fired and expanded in a similar manner. The rotor is water cooled by the water circulated in the space 6 and is air cooled by virtue of the open formation of its center which permits the rotating parts to circulate air around the inner portion of the casing and rotor.

I claim:

1. A rotary internal combustion engine including a stationary casing, a rotor operating in the casing and co-acting therewith to define an intake and compression chamber and a working chamber, sliding vanes mounted on the rotor co-operable with the casing and operating in said chambers, said rotor having a chamber therein associated with each vane and extending on the opposite sides of its vane, said rotor having an inlet opening in advance of each vane leading into the adjacent chamber in the rotor and also having an outlet opening behind each vane leading out of the adjacent chamber, and valves controlling the inlet and outlet openings.

2. A rotary internal combustion engine including a stationary casing, a rotor operating in the casing and co-acting therewith to define an intake and compression chamber and a working chamber, sliding vanes mounted on the rotor co-operable with the casing and operating in said chambers, said rotor having a chamber therein associated with each vane and extending on the opposite sides of its vane, said rotor having an inlet opening in advance of each vane leading into the adjacent chamber in the rotor and also having an outlet opening behind each vane leading out of the adjacent chamber, an inlet valve co-operable with the inlet opening, an outlet valve co-operable with the outlet opening, spring means for closing the valves, and means for positively opening the valves at the proper time in the cycle of operation.

3. A rotary internal combustion engine including a stationary casing, a rotor operating in the casing and co-acting therewith to define an intake and compression chamber and a working chamber, sliding vanes mounted on the rotor co-operable with the casing and operating in said chambers, said rotor having a chamber therein associated with each vane and extending on the opposite sides of its vane, said rotor having an inlet opening in advance of each vane leading into the adjacent chamber in the rotor and also having an outlet opening behind each vane leading out of the adjacent chamber, an inlet valve co-operable with the inlet opening, an outlet valve co-operable with the outlet opening, spring means for closing the valve, means for positively opening the valves at the proper time in the cycle of operation and including fixed cams mounted on the stationary casing, and valve lifters pivoted to the rotor engaged with the cams and co-acting with the valves.

FRED M. NEWSON.